L. ORSIE.
LAWN MOWER SHARPENER.
APPLICATION FILED JULY 15, 1914.

1,128,716.

Patented Feb. 16, 1915.

WITNESSES:
N. H. Eggleston
Ethel Westfall

INVENTOR
Louis Orsie
BY
L. L. Westfall
ATTORNEY

UNITED STATES PATENT OFFICE.

LOUIS ORSIE, OF SPOKANE, WASHINGTON.

LAWN-MOWER SHARPENER.

1,128,716.  Specification of Letters Patent.  Patented Feb. 16, 1915.

Application filed July 15, 1914. Serial No. 851,040.

*To all whom it may concern:*

Be it known that I, LOUIS ORSIE, a citizen of the United States of America, residing at Spokane, in the county of Spokane and State of Washington, have invented certain new and useful Improvements in Lawn-Mower Sharpeners, of which the following is a specification.

This invention pertains to lawn mower sharpeners and has for its object to provide a sharpener that will put a uniform cutting edge on each blade of the mower the full length of the mower, and to provide a sharpener that may be attached to the mower in such a manner that the running of the mower and the rotation of the blades will automatically do the sharpening.

The device will be hereinafter particularly described and illustrated in the accompanying drawings, in which—

Figure 1:
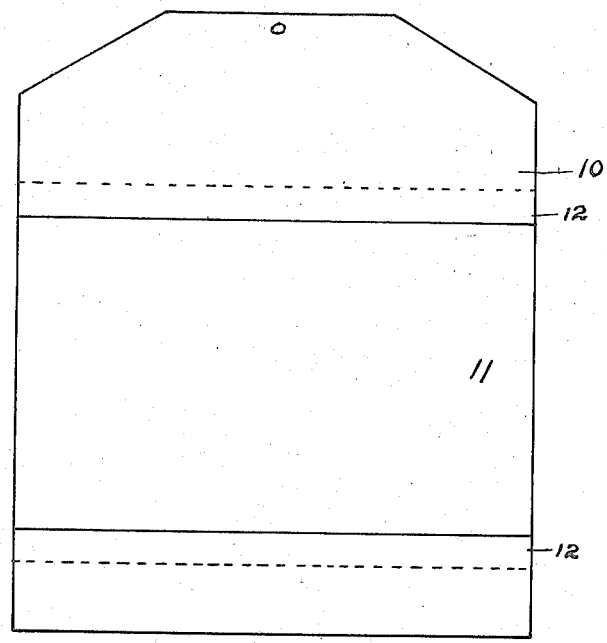
Figure 2:
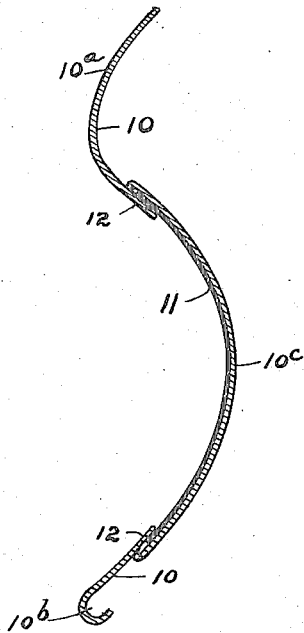
Figure 3:
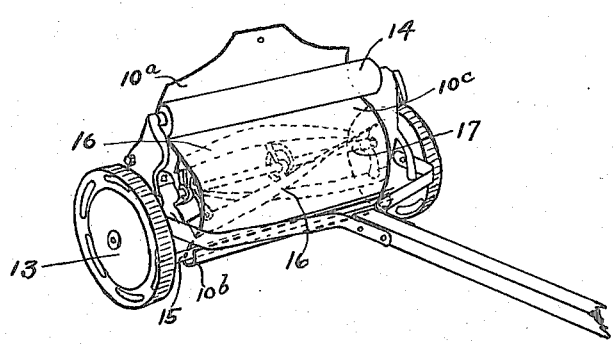

Figure 1, is a front view of the device, Fig. 2, is an end view thereof, and Fig. 3, is a view of a lawn mower with the device attached thereto.

A flexible plate 10, preferably made of a suitable metal, normally having one end curved as at 10$^a$ and the opposite end curved as at 10$^b$, with the center portion 10$^c$ bent to a crescent shape, has attached thereto on the inner surface of the crescent shaped portion 10$^c$, a paper 11 carrying a grit on its surface such as emery paper, the same being held in place by the overlapping edges 12 of the plate 10.

The device is attached to a lawn mower 13 as shown in Fig. 3, the portion 10$^a$ being inserted under and bent over the roller 14, and the portion 10$^b$ being hooked over the transversely arranged brace 15. The portion 10$^c$ is drawn down tightly against the blades 16 of the mower 13, by manually pulling on the portion 10$^a$ and then binding the same over the roller 14, much as is shown in Fig. 3. The mower 13 is then inverted as shown in Fig. 3 and pushed forward or drawn backward. The rotation of the reel 17 carrying the blades 16 causes the blades 16 to come into grinding contact with the grit paper 11 whereby the blades are ground. The grit paper 11 and plate 10 are made wide enough to extend laterally the full length of the blades 16. This method of sharpening a lawn mower insures that the full length of the blade and each blade will be ground to a uniformity so that a uniform cutting edge is obtained.

What I claim is,

A lawn mower sharpener comprising a flexible plate having flat surfaces and having an attachment of suitable abrading material on one flat side thereof, a curved portion at one end of the plate for engagement with a roller on a lawn mower and a channel portion at the opposite end for engagement with a bar extending transversely across the mower.

In testimony whereof I affix my signature in presence of two witnesses.

LOUIS ORSIE.

Witnesses:
B. H. EGGLESTON,
H. M. WILEY.